US008024386B2

(12) United States Patent
Song et al.

(10) Patent No.: US 8,024,386 B2
(45) Date of Patent: Sep. 20, 2011

(54) APPARATUS AND METHOD FOR GENERATING RANDOM NUMBER AND DATA INTERACTION SYSTEM THEREOF

(75) Inventors: Anfei Song, Shenzhen (CN); Bo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 904 days.

(21) Appl. No.: 11/856,459

(22) Filed: Sep. 17, 2007

(65) Prior Publication Data
US 2008/0183788 A1   Jul. 31, 2008

(30) Foreign Application Priority Data
Nov. 10, 2006 (CN) .......................... 2006 1 0063593

(51) Int. Cl.
G06F 1/02 (2006.01)
G06F 7/58 (2006.01)

(52) U.S. Cl. ........................................ 708/251; 708/250
(58) Field of Classification Search ........... 708/250–256
See application file for complete search history.

(56) References Cited

U.S. PATENT DOCUMENTS

| 3,790,768 | A | * | 2/1974 | Chevalier et al. | 708/251 |
|---|---|---|---|---|---|
| 4,578,649 | A | * | 3/1986 | Shupe | 331/78 |
| 5,007,087 | A | * | 4/1991 | Bernstein et al. | 380/46 |
| 6,061,702 | A | * | 5/2000 | Hoffman | 708/251 |
| 6,631,390 | B1 | * | 10/2003 | Epstein | 708/250 |
| 6,687,721 | B1 | * | 2/2004 | Wells et al. | 708/250 |
| 6,795,837 | B1 | * | 9/2004 | Wells | 708/3 |
| 7,349,935 | B2 | * | 3/2008 | Atsumi et al. | 708/250 |
| 7,904,494 | B2 | * | 3/2011 | Cho et al. | 708/251 |
| 2001/0023423 | A1 | * | 9/2001 | Marinet | 708/250 |
| 2003/0067336 | A1 | * | 4/2003 | Cruz-Albrecht | 327/164 |

(Continued)

FOREIGN PATENT DOCUMENTS
CN   1696893 A   11/2005
(Continued)

OTHER PUBLICATIONS

C. S. Petrie and J. A. Connelly, "Modeling and simulation of oscillator-based random number generators", Proc. ISCAS '96, vol. 4, pp. 324-327, 1996.*
Petrie et al., "Modeling and Simulation of Oscillator-Based Random Number Generators," 1996, Institute of Electrical and Electronic Engineers, Atlanta, Georgia.

*Primary Examiner* — Lewis A Bullock, Jr.
*Assistant Examiner* — Matthew Sandifer
(74) *Attorney, Agent, or Firm* — Leydig, Voit & Mayer, Ltd.

(57) ABSTRACT

Embodiments of the present invention provide a random number generating apparatus, including a first level sampling module and a second level sampling module. The first level sampling module includes a first oscillator, a second oscillator and a first sampler capable of sampling the first oscillating signal with the second oscillating signal to generate a first output signal. The second level sampling module includes a voltage-controlled oscillator capable of generating a voltage-controlled oscillating signal by using the first output signal as a control voltage, a third oscillator capable of generating a third oscillating signal, and a second sampler, capable of sampling the third oscillating signal with the voltage-controlled oscillating signal and generating random numbers. The first level oscillator sampling provides a random control voltage for the second level oscillator sampling, therefore improving the randomicity of the second level oscillator sampling as well as the random number generating rate.

9 Claims, 3 Drawing Sheets

U.S. PATENT DOCUMENTS

| | | | |
|---|---|---|---|
| 2004/0010526 A1* | 1/2004 | Dichtl | 708/251 |
| 2004/0030734 A1* | 2/2004 | Wells et al. | 708/250 |
| 2005/0027765 A1* | 2/2005 | Wells | 708/250 |
| 2006/0069706 A1 | 3/2006 | Lazich et al. | |
| 2006/0218212 A1* | 9/2006 | Mattison | 708/251 |
| 2010/0146025 A1* | 6/2010 | Ergun | 708/251 |

FOREIGN PATENT DOCUMENTS

| | | |
|---|---|---|
| CN | 1752924 A | 3/2006 |
| CN | 1949708 B | 4/2007 |

* cited by examiner

APPARATUS AND METHOD FOR GENERATING RANDOM NUMBER AND DATA INTERACTION SYSTEM THEREOF

This application claims priority to Chinese Patent Application No. 200610063593.1, filed Nov. 10, 2006, which is hereby incorporated by reference.

FIELD OF THE INVENTION

The present invention relates to electronic technologies, and particularly, to an oscillator based apparatus and a method for generating random numbers and a data interaction system thereof.

BACKGROUND OF THE INVENTION

In the existing data interaction process, the security of data is achieved by encrypting the data to be transmitted at a transmitting end and decrypting the data at a receiving end. Almost all encryption system relies on the unpredictability and unrepeatability of keys, and numbers featuring the unpredictability and unrepeatability of keys are generated by a Random Number Generator (RNG).

The existing RNG technologies mainly include noise amplifying technology, analog unsteady state technology and oscillator sampling technology. According to the noise amplifying technology, random numbers are generated by amplifying noises, such as thermal noises or flicker noises; according to the analog unsteady state technology, random numbers are generated by converting unsteady analog signals with an Analog-Digital Converter (ADC). Both technologies are complicated and require high cost in design.

According to the oscillator sampling technology, two oscillators of different frequencies sample each other to generate random numbers, which requires fewer devices, smaller size on chips and lower cost. FIG. 1 shows a common oscillator sampling based random number generating circuit, including Noise Source 11, Amplifier (AMP) 12, Low Frequency Voltage-Controlled Oscillator (L-Freq KVCO) 13, High Frequency Oscillator (H-Freq Osc) 14 and D-type Flip-flop (DFF) 15.

Noise Source 11 is used for generating thermal noises or flicker noises, which are amplified by AMP 12 to create a frequency control voltage applied to L-Freq KVCO 13. The frequency of L-Freq KVCO 13 keeps on changing at random under the control voltage. The output of L-Freq KVCO 13 serves as a clock input of Flip-flop 15 while the output of H-Freq Osc 14 serves as the data input of Flip-flop 15. The output of L-Freq KVCO 13 samples the output of H-Freq Osc 14 to obtain random numbers.

However, limited by Noise Source 11, the random number generating rate of the above circuit is far lower than 1 Mbps and cannot meet the demand of a system which transmits data in a higher rate at present.

SUMMARY OF THE INVENTION

Embodiments of the present invention provide an apparatus and a method for generating random numbers to improve the random number generating rate.

An apparatus for generating random numbers includes:
a first level sampling module, capable of sampling a first oscillating signal with a second oscillating signal to generate a first output signal; and
a second level sampling module, capable of generating a voltage-controlled oscillating signal using the first output signal as a control voltage, and sampling a third oscillating signal with the voltage-controlled oscillating signal to generate a random number; and
the frequencies of the first oscillating signal and the third oscillating signal are higher than the frequency of the second oscillating signal.

A method for generating random numbers includes:
sampling a first oscillating signal with a second oscillating signal to generate a first output signal, the frequency of the first oscillating signal being higher than the frequency of the second oscillating signal;
generating a voltage-controlled oscillating signal by using the first output signal as a control signal; and
sampling a third oscillating signal with the voltage-controlled oscillating signal to generate a random number, the frequency of the third oscillating signal being higher than the frequency of the second oscillating signal.

A data interaction system for encrypting data to be transmitted with random numbers, comprising an apparatus for generating random numbers, wherein the apparatus includes:
a first level sampling module capable of sampling a first oscillating signal with a second oscillating signal to generate a first output signal; and
a second level sampling module capable of generating a voltage-controlled oscillating signal using the first output signal as a control voltage, and sampling a third oscillating signal with the voltage-controlled oscillating signal to generate a random number; and
the frequencies of the first oscillating signal and the third oscillating signal are higher than the frequency of the second oscillating signal.

The apparatus and the method for generating random numbers and a data interaction system thereof in accordance with the embodiments of the present invention provide two levels of oscillator sampling, i.e., a random control voltage is provided for the second level oscillator sampling by the first level oscillator sampling, therefore improving the randomicity of the second level oscillator sampling as well as the random number generating rate.

EMBODIMENTS OF THE INVENTION

The present invention is further explained hereinafter with reference to accompanying drawings and embodiments.

Figure 1:
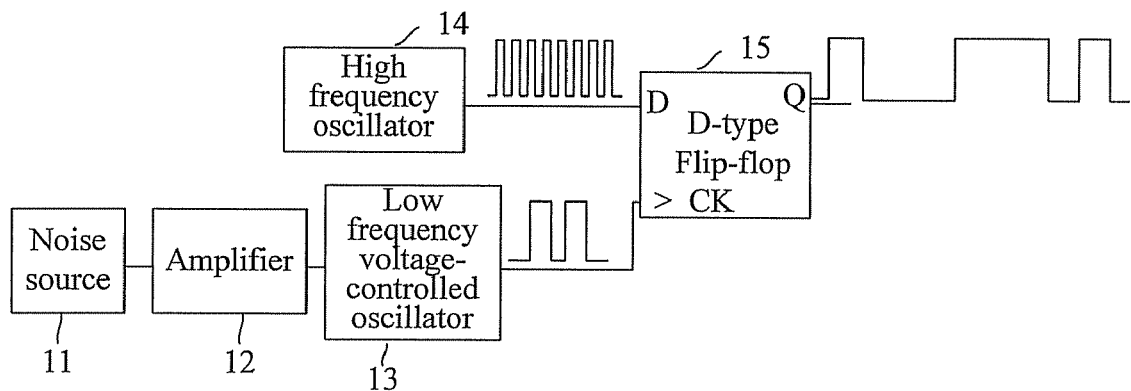
FIG. 1 is a schematic drawing illustrating the structure of an oscillator based apparatus for generating random numbers in the prior art.
Figure 2:
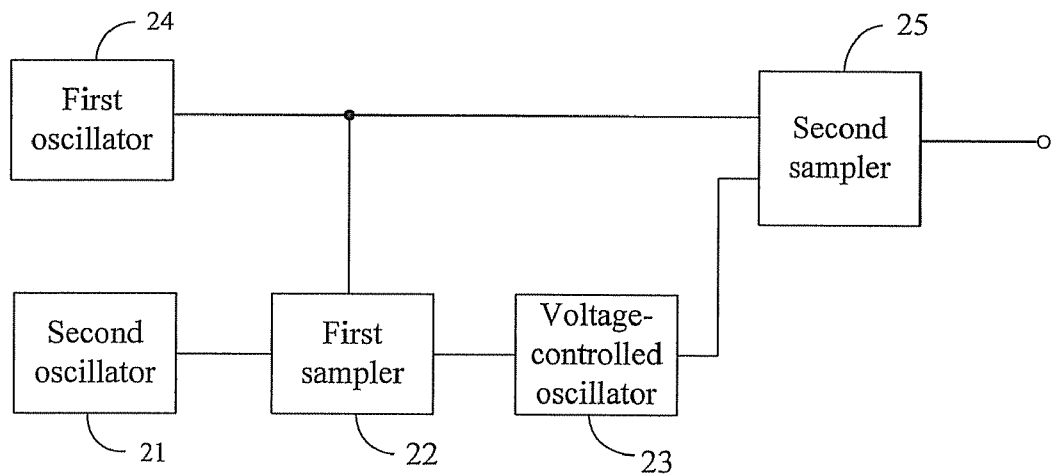
FIG. 2 is a schematic drawing illustrating the structure of an apparatus for generating random numbers in accordance with an embodiment of the present invention.

FIG. 2 is a schematic drawing illustrating the structure of an apparatus for generating random numbers in accordance with an embodiment of the present invention. As shown in FIG. 2, the apparatus for generating random numbers in accordance with an embodiment of the present invention includes two levels of sampling modules: the first level sampling module includes First Oscillator 24, Second Oscillator 21 and First Sampler 22, and the second level sampling module includes First Oscillator 24, Voltage-Controlled Oscillator 23 and Second Sampler 25.

It should be noted that First Oscillator 24 may be replaced with any kind of module which provides oscillating signals with a frequency higher than the frequency of oscillating signals generated by Second Oscillator 21.

First Sampler 22 samples, with a second oscillating signal generated by Second Oscillator 21, a first oscillating signal generated by First Oscillator 24 to generate a first output signal; a voltage-controlled oscillating signal is generated by Voltage-Controlled Oscillator 23 by using the first output signal as a control signal of Voltage-Controlled Oscillator 23; and the voltage-controlled oscillating signal generated by Voltage-Controlled Oscillator 23 is used for sampling by Second Sampler 25.

Figure 3:
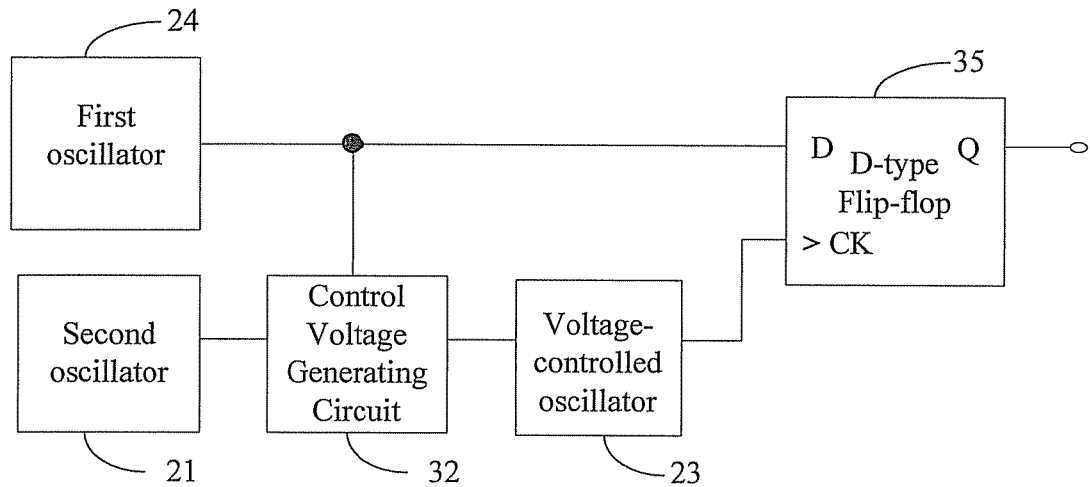
FIG. 3 is a schematic drawing illustrating the structure of an apparatus for generating random numbers in accordance with another embodiment of the present invention.

FIG. 3 is a schematic drawing illustrating the structure of an apparatus for generating random numbers in accordance with another embodiment of the present invention. Control Voltage Generating Circuit 32 is adopted in First Sampler 22, and First DFF 35 is adopted in Second Sampler 25.

First Oscillator 24 and Second Oscillator 21 are coupled with the input end of Control Voltage Generating Circuit 32 respectively. Voltage-Controlled Oscillator 23 is coupled with the output end of Control Voltage Generating Circuit 32. The data end D of First DFF 35 is coupled with the output end of First Oscillator 24. The clock end CK of First DFF 35 is coupled with the output end of Voltage-Controlled Oscillator 23. Obviously, First DFF 35 may be replaced by a circuit consisting of other components, e.g., a circuit consisting of a JK Flip-flop, an RS Flip-flop or a T Flip-flop. First Oscillator 24 in the second sampling module may also be replaced with a third oscillator, i.e., First Oscillator 24 is dedicated to generate oscillating signals in the first sampling module for Control Voltage Generating Circuit 32, but not output oscillating signals to the data end of First DFF 35. A third oscillator is used for generating the oscillating signals to be outputted to the data end of First DFF 35.

In this embodiment, Control Voltage Generating Circuit 32 samples an oscillating signal generated by First Oscillator 24 with an oscillating signal generated by Second Oscillator 21 to generate an output signal; an oscillating signal is generated by Voltage-Controlled Oscillator 23 in the second level sampling module by using the output signal of the first level sampling module as a control voltage; and random numbers are generated by First DFF 35 by sampling the oscillating signal generated by First Oscillator 24 with the oscillating signal generated by Voltage-Controlled Oscillator 23.

First Oscillator 24 is a high frequency oscillator, and Second Oscillator 21 is a low frequency oscillator. In this embodiment, the frequency of the oscillating signal generated by First Oscillator 24 is higher than the frequency of the oscillating signal generated by Second Oscillator 21, the proportion of the frequencies of the two signals is greater than or equal to 100:1.

For example, in one embodiment of the present invention, the center frequency of First Oscillator 24 is 600 MHz and the center frequency of Second Oscillator 21 is 3 MHz, i.e., the proportion of the frequencies of the signals generated by the two oscillators equals to 200:1. The center frequency of the Voltage-Controlled Oscillator 23 is 20 MHz, maintaining a proportion of 1:30 to the frequency of the oscillating signal generated by the First Oscillator 24.

In one embodiment of the present invention, the data end D of First DFF 35 may also be connected to the output end of the third oscillator which generates oscillating signals with a frequency higher than the frequency of the oscillating signal provided by Second Oscillator 21. The frequency of the third oscillator may or may not equal to the frequency of the oscillating signal provided by First Oscillator 24.

The apparatus for generating random numbers may be manufactured with varieties of manufacturing techniques, and CMOS based manufacturing technique is taken as an example in the description herein.

Figure 4:
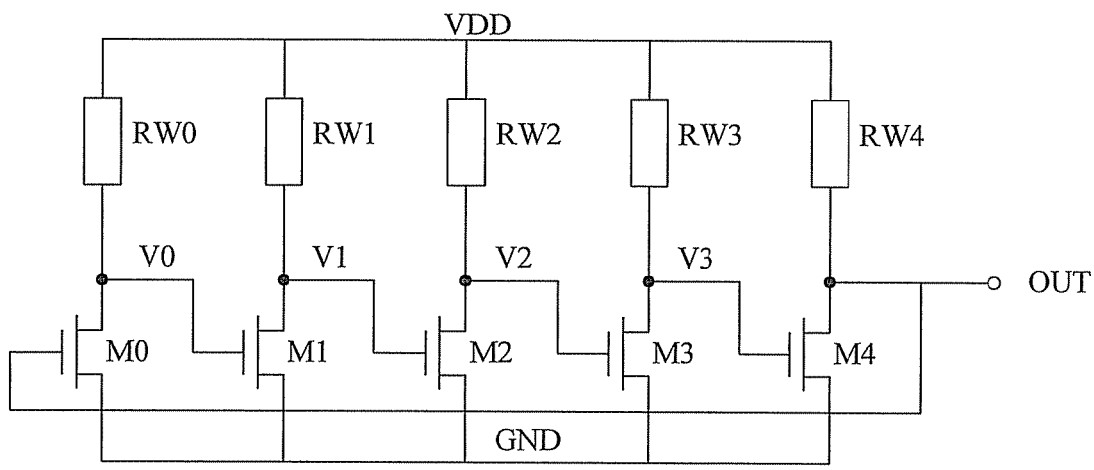
FIG. 4 is a schematic drawing illustrating the structure of the second oscillator in FIG. 3.

FIG. 4 is a schematic drawing illustrating the structure of the second oscillator in FIG. 3. In this embodiment, Second Oscillator 21 consists of a 5-level inverse phase amplification circuit. M0, M1, M2, M3 and M4 are N-channel Metal-Oxide Semiconductors (NMOS) transistors, and RW0, RW1, RW2, RW3 and RW4 are well resistors. If the initial voltage of output signal OUT is of low level, after the power supply VDD is stabilized, the initial voltage is inversely amplified by M0, M1, M2 and M3 so that V0 is of high level, V1 is of low level, V2 is of high level, and V3 is of low level. When V3 is amplified by M4, the output signal OUT turns to high level.

In the above circuit, the NMOS transistors, M0, M1, M2, M3 and M4, form a positive feedback loop. The output signal OUT, after being amplified by a positive feedback, generates an oscillating signal. Only when the level of the Second Oscillator 21 is odd and is greater than 1, e.g., 3-level or 7-level, a positive feedback loop may be formed to generate the oscillating signal.

In this embodiment, the load resistors of the NMOS transistors M0, M1, M2, M3 and M4 use the well resistors RW0, RW1, RW2, RW3 and RW4. Because the noise and resistance difference of well resistors are large, Second Oscillator 21 provides relatively large phase noises and frequency offset.

The Second Oscillator 21 may be implemented by using a differential ring oscillator, or a single end voltage-controlled oscillator, or a differential voltage-controlled oscillator instead of the single end ring oscillator in this embodiment.

Figure 5:
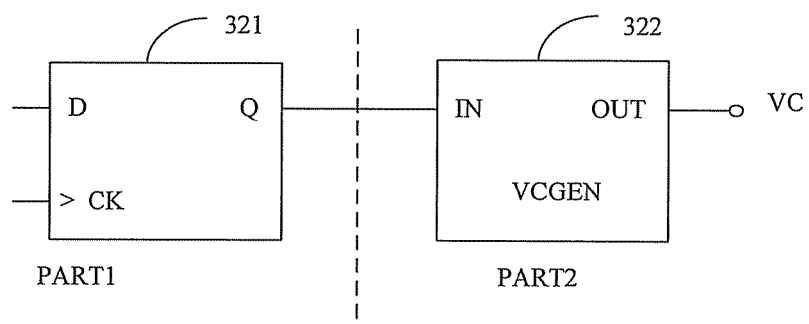
FIG. 5 is a schematic drawing illustrating the structure of the control voltage generating circuit in FIG. 3.

FIG. 5 shows the schematics of Control Voltage Generating Circuit 32 in FIG. 3. In this embodiment, Control Voltage Generating Circuit 32 consists of two parts: the first part including Second DFF 321 and the second part including Voltage Generating Circuit (VCGEN) 322. The data end D of Second DFF 321 is connected to the output end of First Oscillator 24, the clock end CK of Second DFF 321 is connected to the output end of Second Oscillator 21, the output end Q of Second DFF 321 is connected to the input end IN of VCGEN 322. Second DFF 321 implements sampling the high frequency oscillating signal generated by First Oscillator 24 with the low frequency oscillating signal generated by Second Oscillator 21, and therefore the output end Q of Second DFF 321 provides a random jump signal. The VCGEN 322 converts the random jump signal into a continuous gradually variant signal with small amplitude so as to continuously control the frequency variation of Voltage-Controlled Oscillator 23.

Figure 6:
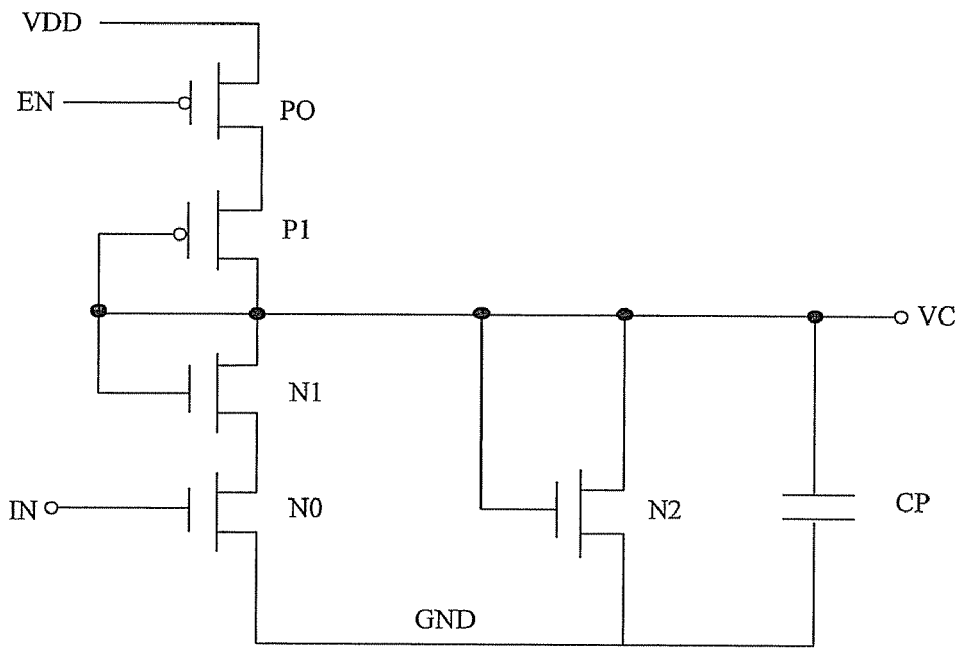
FIG. 6 is a schematic drawing illustrating the structure of the second part in FIG. 5.

The detailed implementation of VCGEN 322 in FIG. 5 is shown in FIG. 6. VCGEN 322 includes NMOS transistors N0, N1 and N2, P-channel Metal-Oxide Semiconductors (PMOS) transistors P0 and P1, and a capacitor CP. The gate of First PMOS transistor P0 is connected to an enable signal EN, the source of First PMOS transistor P0 is connected to a high level VDD and the drain of First PMOS transistor P0 is connected to the source of Second PMOS transistor P1. The gate and the drain of Second PMOS transistor P1 are connected to an output voltage VC. The gate of First NMOS transistor N0 is connected to an input signal IN, i.e., the output end Q of Second DFF 321. The source of First NMOS transistor N0 is grounded and the drain of First NMOS transistor N0 is connected to the source of Second NMOS transistor N1. The gate and the drain of Second NMOS transistor N1 and the gate and the drain of Third NMOS transistor N2 are connected to the output voltage VC respectively. The source of Third NMOS transistor N2 is grounded. One end of the capacitor C is grounded while the other end of the capacitor CP is connected to the output voltage VC.

The EN is an enable signal. When the EN is at a high level, PMOS transistor P0 is turned off, there is no current in the circuit, and the power consumption of the circuit drops to the lowest. When the EN is at a low level, PMOS transistor P0 is turned on, and the circuit is in a normal working state. While the circuit is in a normal working state, because the gate voltage of NMOS transistor N0 is controlled by a random jump signal, NMOS transistor N0 will be turned off or turned on at random. When NMOS transistor N0 is turned on, NMOS transistors N0, N1 and N2 and PMOS transistors P0 and P1 will form a voltage-dividing circuit, and the output voltage VC may be calculated by the following equation:

$$VC = VDD \times \frac{r_{N0,1} // r_{N2}}{r_{P0,1} + r_{N0,1} // r_{N2}}. \quad (1)$$

The $r_{N0,1}$ indicates the equivalent series resistance of NMOS transistors N0 and N1, $r_{N2}$ indicates the equivalent resistance of NMOS transistor N2, and $r_{P0,1}$ indicates the equivalent series resistance of PMOS transistors P0 and P1. When NMOS transistor N0 is turned off, NMOS transistor N1 will also be turned off. NMOS transistor N2 and PMOS transistors P0 and P1 form a voltage-dividing circuit. The output voltage VC may be calculated by the following equation:

$$VC = VDD \times \frac{r_{N2}}{r_{P0,1} + r_{N2}}. \quad (2)$$

It can be seen that the range of the output voltage VC is determined by Equations (1) and (2). Appropriate width-length ratio of the NMOS transistor and the PMOS transistors will provide an appropriate variation range for the output voltage VC, e.g., [1−0.05, 1+0.05] (V).

In the second part of Control Voltage Generating Circuit 32, the output voltage VC is coupled with the grounded capacitor CP so that the jump of the value of the VC between the voltage values determined through Equations (1) and (2) may be prevented by utilizing the gradual variation of the capacitor CP in charge and discharge cycle, thus the continuous control of Voltage-Controlled Oscillator 23 is achieved.

The output voltage VC provided by the above technical scheme randomly controls the frequency variation of the signal generated by Voltage-Controlled Oscillator 23 and the signal with a random frequency is used by First DFF 35 in FIG. 3 to sample the output of First Oscillator 24 to generate random numbers ranged evenly from 0 to 1.

Figure 7:
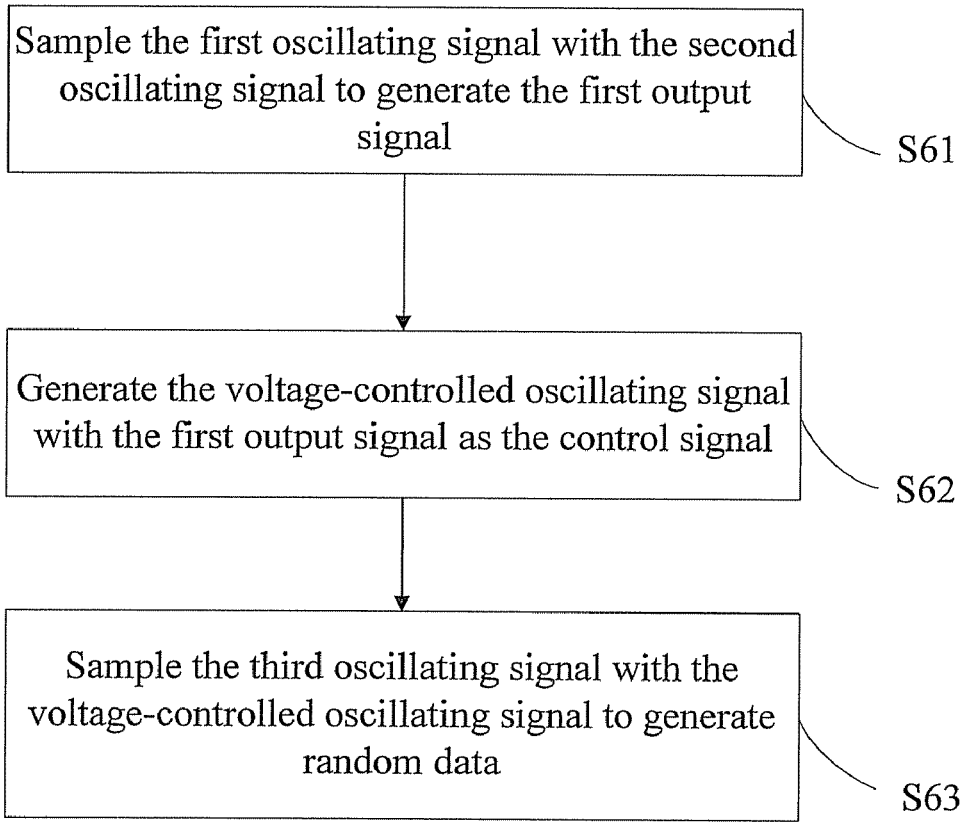
FIG. 7 is a schematic flow chart of a method for generating random numbers in accordance with an embodiment of the present invention.

FIG. 7 is a schematic flow chart of the random number generating method in accordance with an embodiment of the present invention.

Step S61: Sampling a first oscillating signal with a second oscillating signal to generate a first output signal. The frequency of the first oscillating signal is higher than the frequency of the second oscillating signal. In this embodiment, the frequency of the first oscillating signal is 100 times or higher than the frequency of the second oscillating signal. Optionally, the sampling process is performed by a Flip-flop, i.e., the second oscillating signal is applied to the clock end of the Flip-flop, and the first oscillating signal is applied to the data end of the Flip-flop and the output end of the Flip-flop provides an intermediate random signal.

The intermediate random signal is smoothened and converted into the first output signal with continuous and gradual small-amplitude variation.

Step S62: Generating a voltage-controlled oscillating signal by using the first output signal as a control signal. Optionally, the first output signal is used as the control signal to control a voltage-controlled oscillator to generate the voltage-controlled oscillating signal.

Step S63: Sampling a third frequency signal with the voltage-controlled oscillating signal to generate random numbers. The third oscillating signal may be the same signal as the first oscillating signal or be a different signal, as long as the frequency of the third oscillating signal is greater than the frequency of the second oscillating signal. In this embodiment, the frequency of the third oscillating signal is 100 times or even higher than the frequency of the second oscillating signal. Optionally, the sampling process is performed by a Flip-flop, the voltage-controlled oscillating signal is connected to the clock end of the Flip-flop, the third oscillating signal is applied to the data end of the Flip-flop, and the output end of the Flip-flop provides the random numbers.

Because 2-level oscillator sampling is adopted, i.e., a random control voltage is provided for the second level oscillator sampling by the first level oscillator sampling, the randomicity in the second level oscillator sampling as well as the random number generating rate will be improved, and the random number generating rate may reach 20 Mbps.

In practical applications, multiple-level sampling may be adopted in accordance with an embodiment of the present invention, thereby achieving an even higher random number generating rate.

The apparatus and the method for generating random numbers may be applied to a data interaction system so that the data interaction system may generate random numbers with the apparatus and the method for generating random numbers in accordance with an embodiment of the present invention, and data to be transmitted are encrypted by using the generated random numbers for transmission, therefore the security of data interaction is assured.

The apparatus and the method for generating random numbers and a data interaction system thereof are suitable for the applications requiring high random number generating rate (20 Mbps at most) and small chip size.

The foregoing is only preferred embodiments of this invention. The protection scope of this invention, however, is not limited to the above description. Any alteration or substitution within the technical scope disclosed by this invention, easily occurring to those skilled in the art should be covered by the protection scope of this invention. Therefore, the protection scope of the present invention should be determined according to claims.

What is claimed is:

1. An apparatus for generating random numbers, comprising:
    a first level sampling device comprising a first oscillator configured to generate a first oscillating signal, a second oscillator configured to generate a second oscillating signal, and a first sampler configured to sample the first oscillating signal under control of the second oscillating signal to generate a first output signal; and a second level sampling device comprising a voltage-controlled oscillator configured to generate a voltage-controlled oscillating signal by using the first output signal as a control voltage, and a second sampler configured to sample the first oscillating signal under control of the voltage-controlled oscillating signal to generate a random number; wherein:

the first sampler comprises a D-type Flip-flop comprising a data input coupled to an output of the first oscillator and a clock input coupled to an output of the second oscillator, the second sampler is a D-type Flip-flop comprising a data input coupled to the output of the first oscillator and a clock input coupled to an output of the voltage-controlled oscillator, and a frequency frequencies of the first oscillating signal is higher than a frequency of the second oscillating signal.

2. The apparatus of claim 1, wherein the second oscillator is selected from the group consisting of: a single end ring oscillator, a differential ring oscillator, a single end voltage-controlled oscillator, and a differential voltage-controlled oscillator.

3. The apparatus of claim 1, wherein the first sampler comprises:

a voltage generating circuit configured to convert a random jump signal from the output end of the second DFF into the first output signal continuously and gradually varied with small amplitude, wherein an input end of the voltage generating circuit is connected to an output end of the second DFF.

4. The apparatus of claim 3, wherein the voltage generating circuit comprises:

a first PMOS transistor, wherein a gate of the first PMOS transistor is connected to an enable signal, and a source of the first PMOS transistor is connected to a high level;

a second PMOS transistor, wherein a source of the second PMOS transistor is connected to a drain of the first PMOS transistor, and a gate and a drain of the second PMOS transistor is connected to an output voltage;

a first NMOS transistor, wherein a gate of the first NMOS transistor is connected to the output end of the second DFF, a source of the first NMOS is grounded;

a second NMOS transistor, wherein a source of the second NMOS transistor is connected to a drain of the first NMOS transistor, and a gate and drain of the second NMOS transistor are connected to the output voltage;

a third NMOS transistor, wherein a gate and a drain of the third NMOS transistor are connected to the output voltage, and a source of the third NMOS transistor is grounded; and a capacitor, wherein one end of the capacitor is grounded, and the other end of the capacitor is connected to the output voltage.

5. The apparatus of claim 1, wherein the frequency of the first oscillating signal are at least 100 times higher than the frequency of the second oscillating signal generated by the second oscillator.

6. A method for generating random numbers, comprising:
generating a first oscillating signal by a first oscillator,
generating a second oscillating signal by a second oscillator, sampling the first oscillating signal by a first sampler under control of the second oscillating signal to generate a first output signal, wherein, a frequency of the first oscillating signal is higher than a frequency of the second oscillating signal;

generating a voltage-controlled oscillating signal by a voltage-controlled oscillator by using the first output signal as a control signal; and sampling the first oscillating signal by a second sampler under control of the voltage-controlled oscillating signal to generate a random number by the second device, wherein:

the first sampler comprises a D-type Flip-flop comprising a data input coupled to an output of the first oscillator and a clock input coupled to an output of the second oscillator, the second sampler is a D-type Flip-flop comprising a data input coupled to the output of the first oscillator and a clock input coupled to an output of the voltage-controlled oscillator.

7. The method of claim 6, wherein the sampling the first oscillating signal under the control of the second oscillating signal to generate the first output signal by a first device comprises:

sampling the first oscillating signal by using the second oscillating signal as a clock signal to generate an intermediate random signal by a first device; and smoothening the intermediate random signal and converting the smoothened intermediate random signal into the first output signal with a continuous gradual small-amplitude variation by the first device.

8. The method of claim 6, wherein the frequency of the first oscillating signal is at least 100 times higher than the frequency of the second oscillating signal.

9. A data interaction system for encrypting data to be transmitted with random numbers, comprising an apparatus for generating random numbers, wherein the apparatus comprises:

a first level sampling device comprising a first oscillator configured to generate a first oscillating signal, a second oscillator configured to generate a second oscillating signal, and a first sampler configured to sample the first oscillating signal under control of the second oscillating signal to generate a first output signal; and a second level sampling device comprising a voltage-controlled oscillator configured to generate a voltage-controlled oscillating signal by using the first output signal as a control voltage, and a second sampler configured to sample the first oscillating signal under control of the voltage-controlled oscillating signal to generate a random number; wherein:

the first sampler comprises a D-type Flip-flop comprising a data input coupled to an output of the first oscillator and a clock input coupled to an output of the second oscillator, the second sampler is a D-type Flip-flop comprising a data input coupled to the output of the first oscillator and a clock input coupled to an output of the voltage-controlled oscillator, and a frequency of the first oscillating signal is higher than a frequency of the second oscillating signal.

* * * * *

UNITED STATES PATENT AND TRADEMARK OFFICE
CERTIFICATE OF CORRECTION

| | | |
|---|---|---|
| PATENT NO. | : 8,024,386 B2 | |
| APPLICATION NO. | : 11/856459 | |
| DATED | : September 20, 2011 | |
| INVENTOR(S) | : Song et al. | |

It is certified that error appears in the above-identified patent and that said Letters Patent is hereby corrected as shown below:

Column 7, line 16, "a frequency frequencies of the" should read --a frequency of the--.

Signed and Sealed this
Sixth Day of December, 2011

David J. Kappos
*Director of the United States Patent and Trademark Office*